United States Patent
Tubridy

(10) Patent No.: US 8,905,698 B2
(45) Date of Patent: Dec. 9, 2014

(54) RETAINING RING

(75) Inventor: Gary Tubridy, Somerton (GB)

(73) Assignee: Avalon Sciences Limited, Somerset (GB)

( * ) Notice: Subject to any disclaimer, the term of this patent is extended or adjusted under 35 U.S.C. 154(b) by 0 days.

(21) Appl. No.: 13/988,994

(22) PCT Filed: Nov. 11, 2011

(86) PCT No.: PCT/GB2011/052209
§ 371 (c)(1),
(2), (4) Date: Jun. 21, 2013

(87) PCT Pub. No.: WO2012/069808
PCT Pub. Date: May 31, 2012

(65) Prior Publication Data
US 2013/0287523 A1    Oct. 31, 2013

(30) Foreign Application Priority Data
Nov. 23, 2010   (GB) .................................. 1019861.2

(51) Int. Cl.
*F16B 21/18*   (2006.01)
*E21B 17/02*   (2006.01)
(52) U.S. Cl.
CPC ............... *F16B 21/18* (2013.01); *F16B 21/186* (2013.01); *E21B 17/023* (2013.01)
USPC .......................................... 411/517; 411/519
(58) Field of Classification Search
USPC ........................... 411/517, 519, 520, 521, 538
See application file for complete search history.

(56) References Cited

U.S. PATENT DOCUMENTS

| 239,111 | A | * | 3/1881 | O'Meara ........................ 206/303 |
| 647,928 | A | * | 4/1900 | Adams ........................... 411/539 |
| 727,707 | A |   | 5/1903 | Stauffer et al. |
| 1,075,760 | A | * | 10/1913 | Butler ........................... 411/540 |
| 1,221,023 | A | * | 4/1917 | Cameron ....................... 411/532 |
| 1,452,492 | A | * | 4/1923 | Carpenter ..................... 411/532 |
| 1,597,525 | A | * | 8/1926 | Knake .......................... 411/540 |
| 1,784,667 | A | * | 12/1930 | Gillet .......................... 411/532 |
| 2,420,921 | A | * | 5/1947 | Waldes ........................ 411/519 |
| 2,450,425 | A | * | 10/1948 | Frisby .......................... 411/517 |
| 2,476,586 | A | * | 7/1949 | Darash ......................... 411/519 |
| 2,547,263 | A | * | 4/1951 | Waldes et al. ................. 411/519 |
| 3,162,084 | A |   | 12/1964 | Wurzel |
| 3,464,307 | A | * | 9/1969 | Wurzel ......................... 411/519 |
| 5,106,252 | A | * | 4/1992 | Shapton ........................ 411/539 |
| 6,845,644 | B1 | * | 1/2005 | Buckner ...................... 70/456 R |
| 7,404,436 | B2 | * | 7/2008 | Booth .......................... 166/173 |
| 7,779,906 | B2 | * | 8/2010 | Porter et al. .................. 166/134 |

FOREIGN PATENT DOCUMENTS

GB          1 529 015      10/1978
WO          WO-99/50525    10/1999

* cited by examiner

*Primary Examiner* — Roberta Delisle
(74) *Attorney, Agent, or Firm* — Foley & Lardner LLP

(57) ABSTRACT

A retaining clip (4) comprising a substantially planar annular sector portion (14) with a sector angle of over 180° and having a recess (15) at each end of the sector arc. Also, a retaining ring comprising a pair of the retaining clip (13), wherein the recessed ends cooperate such that the pair of clips form a complete annulus. Also, a method of installing a retaining ring in a groove formed in a component, comprising inserting a first retaining clip into the groove in a substantially radial direction from a first side of the groove, an inserting a second retaining clip into the groove in a substantially radial direction from a second side of the groove opposite the first.

15 Claims, 2 Drawing Sheets

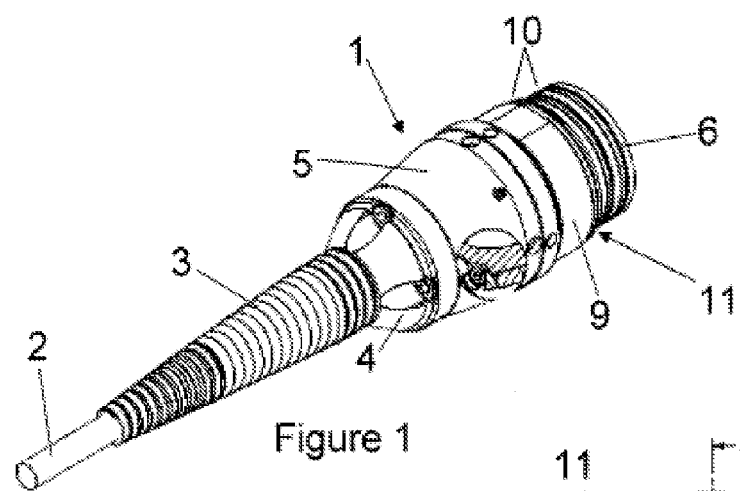
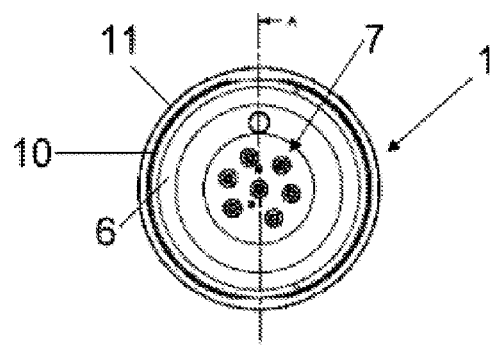
Figure 1
Figure 2
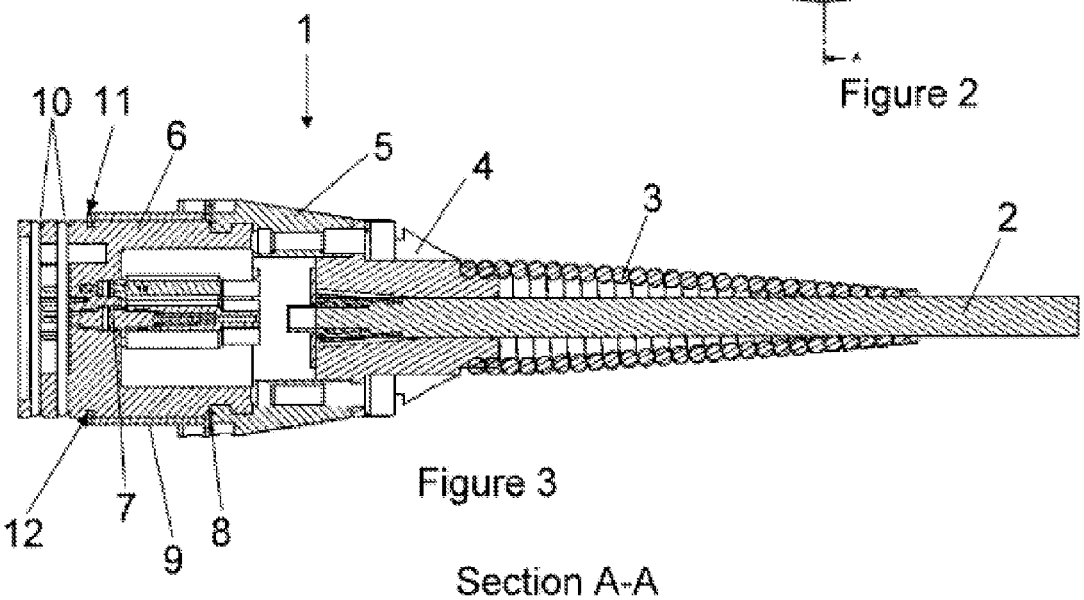
Figure 3
Section A-A

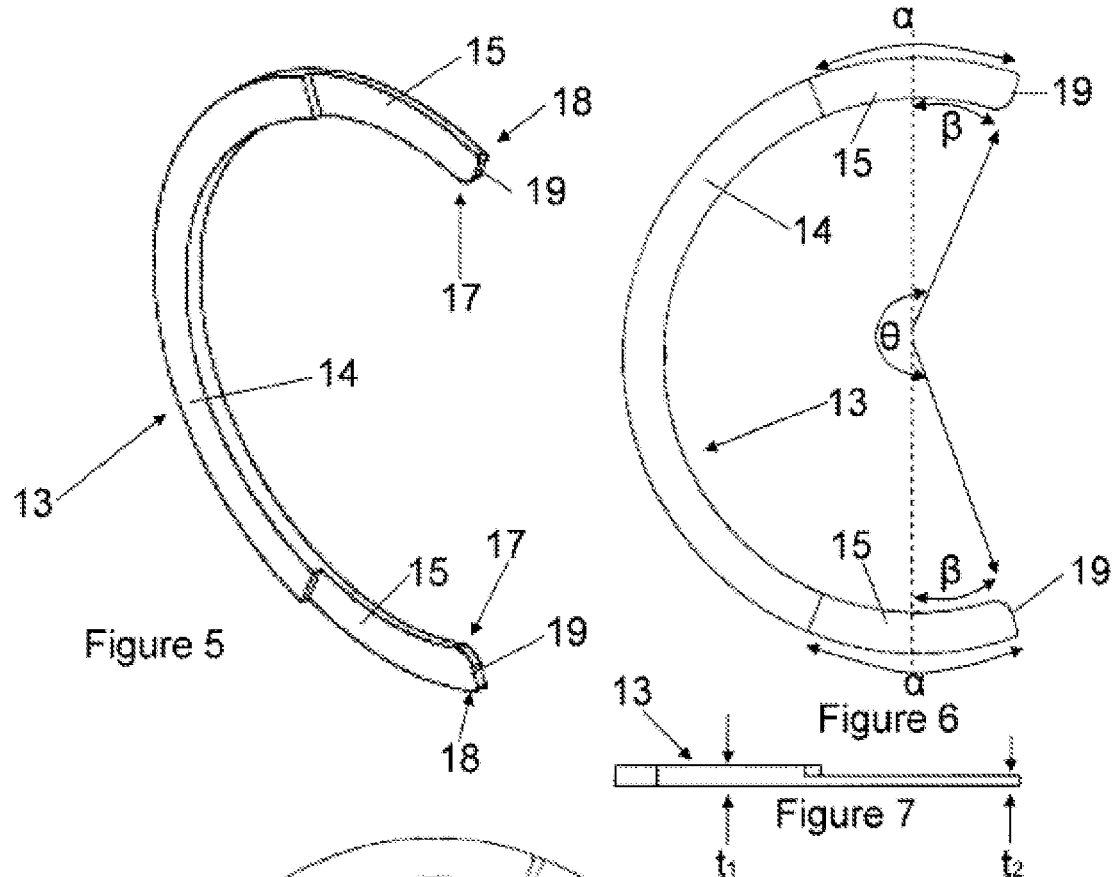
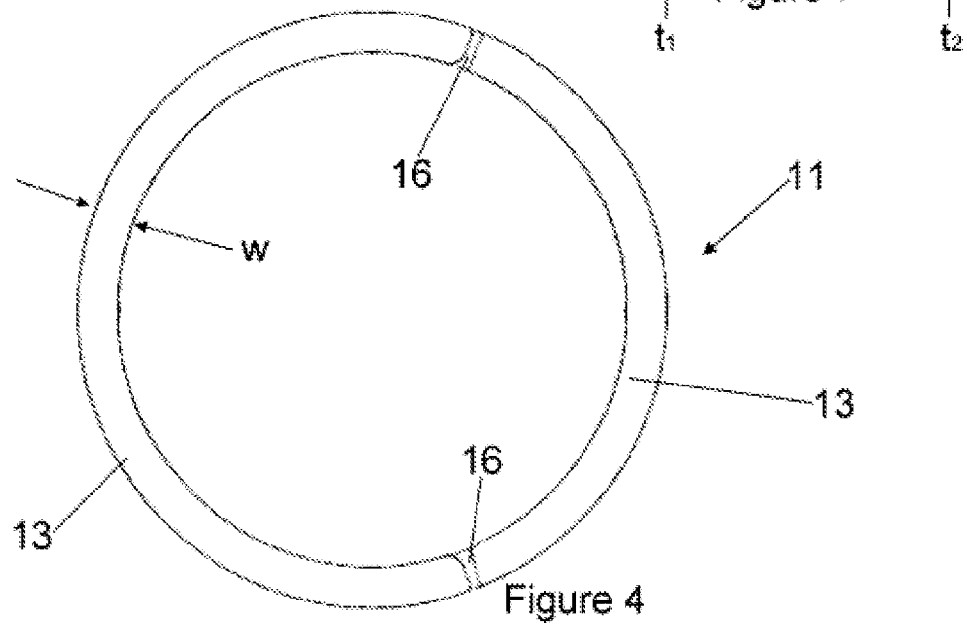

RETAINING RING

CROSS REFERENCE TO RELATED APPLICATIONS

The present application is a National Stage of International Application No PCT/GB2011/052209 filed on Nov. 11, 2011, which claims the benefit of United Kingdom Patent Application No. 1019861.2 filed on Nov. 23, 2010. The entire disclosures of which are incorporated herein by reference.

FIELD OF THE INVENTION

The present invention relates to a retaining clip or ring.

BACKGROUND OF THE INVENTION

A retaining clip or ring is a device which fits in a groove on a shaft or bore to locate one or more other components relative to the shaft or bore. An external retaining ring is typically disposed in a groove on an outer surface of a shaft, and an internal retaining ring is typically disposed in a groove on an inner surface of a bore or housing.

Known retaining rings provide either complete or incomplete coverage of the 360 degree groove surface. Examples of known incomplete retaining rings include "snap rings" (also known as "circlips"), "e-rings" and "crescent rings". Examples of known complete retaining rings include "spiral rings" such as the Spirolox® retaining ring produced by Smalley Ring Steel Company. Spiral retaining rings are typically formed by coiling a flat wire to form a 2-turn or 3-turn spiral. Retaining rings are in wide usage across a variety of industries including aerospace, automotive, mining and drilling.

Where a complete external retaining ring is required, the spiral ring can be problematic to install and remove in certain applications. For example, in the case where the shaft has significant length, then it may become difficult to maintain the spiral ring in an expanded state, due to space constraints for tooling for example, as it is moved along the length of the shaft up to the location of the groove in which it is to be seated. Furthermore, the shaft may have components located upon it that are of softer material than the spiral ring, such as O-ring seals, for example. If a clearance cannot be maintained between the expanded spiral ring and the seal then sliding the spiral ring over the seal may cause damage to the seal. Similar problems to those described above may also be observed with internal spiral rings.

There is therefore a need for an improved retaining ring, which overcomes the installation problems that may be found with spiral rings.

SUMMARY OF THE INVENTION

A first aspect of the invention provides a retaining clip comprising a substantially planar annular sector portion with a sector angle of over 180°, and having a recess at each end of the sector arc.

A second aspect of the invention provides a retaining ring comprising a pair of retaining clips according to the first aspect of the invention, wherein the recessed ends cooperate such that the pair of clips form a complete annulus.

A third aspect of the invention provides a method of installing a retaining ring in a groove formed in a component, the method comprising inserting a first retaining clip in accordance with the first aspect of the invention into the groove in a substantially radial direction from a first side of the groove, and inserting a second retaining clip in accordance with the first aspect of the invention in a substantially radial direction from a second side of the groove opposite the first, such that the installed clips form a complete annulus with their respective recesses cooperating.

The invention is advantageous in that a complete annular retaining ring can be installed in a groove in a component without suffering the drawbacks mentioned above observed with traditional spiral retaining rings. Since the retaining ring of the invention is formed by installing a pair of retaining clips, the retaining ring can be installed in the groove from a radial, rather than an axial, direction of the groove.

The recessed ends of the clips may be substantially planar. This enables the installed clips to have overlapping cooperating recesses.

The sector angle of the clips may be less than 270°, preferably between 200° and 270°, and most preferably between 210° and 240°.

The clip is preferably formed of a resiliently deformable material. Each clip is an over-centre clip since its sector angle is over 180°. By forming the clip of a resiliently deformable material, the clip can be elastically deformed during installation (and removal) and yet be securely retained in the groove when installed.

The clips may be formed of metallic material, preferably stainless steel, spring steel, carbon steel, copper, phosphor bronze or titanium.

Each clip may have a straight radial edge at each end of the sector arc. The straight edge may beneficially provide an edge for cooperating with a clip removal tool, such as a screwdriver blade or the like.

At each end of the sector arc, the interior corners and/or the exterior corners may be rounded. Rounding the corners may reduce or eliminate grazing of the groove seat during installation and removal of the clip. Rounding the corners may also be used to eliminate any exposed sharp corners in the final assembly.

The retaining clips which form the retaining ring may be identical. This would beneficially reduce parts count and manufacturing costs.

However, the retaining clips may also be complimentary but not identical. A pair of non-identical clips may be beneficial where the available space for installing the retaining ring is asymmetric, leaving a larger space on only one side of the groove.

The cooperating recesses of the clips may match imperfectly to define a gap between the retaining clips. This gap may be beneficial for inserting a clip removal tool, such as a screwdriver blade or the like.

The thickness of the annular retaining ring is preferably substantially uniform.

The retaining ring may be an external retaining ring. However, the invention is also applicable to an internal retaining ring.

The retaining clips may include ears for fixing the clips together. This may be beneficial where the installed retaining ring is expected to experience significant vibration and shock.

The retaining ring may be used in a variety of industrial applications including, but not limited to: aerospace, automotive, mining or drilling. In one embodiment, the retaining ring is used in a downhole tool. In particular, the downhole tool includes a cable head assembly and the retaining ring retains a cable head or lower barrel component with respect to a main barrel component of the assembly.

BRIEF DESCRIPTION OF THE DRAWINGS

Embodiments of the invention will now be described, by way of example only, with reference to the accompanying drawings, in which:

FIG. 1 illustrates a cable head assembly of a downhole tool;

FIG. 2 illustrates an end view of the cable head assembly;

FIG. 3 illustrates a cross section view through the cable head assembly along A-A and showing a retaining ring between a rotating nut and an upper body of the cable head assembly;

FIG. 4 illustrates a plan view of the retaining ring comprising a pair of identical retaining clips;

FIG. 5 illustrates one of the retaining clips;

FIG. 6 illustrates a plan view of the retaining clip of FIG. 5; and

FIG. 7 illustrates an end view of the retaining clip of FIG. 5.

DETAILED DESCRIPTION OF EMBODIMENT(S)

FIG. 1 illustrates a cable head assembly 1 of a downhole tool. The cable head assembly 1 is connected to a multi-conductor wireline 2 of indeterminate length. The cable head assembly 1 is disposed at the lower end of the wireline 2 and is suitable for attachment to a variety of downhole electrical equipment such as a downhole sonde, for example.

The cable head assembly 1 includes inter alia a spring 3 which surrounds the lower end of the wireline 2 and is mounted against a taper bush 4. The taper bush 4 is fastened to a split clamp 5. The split clamp 5 retains an upper body component 6 which houses a connector 7. The connector 7 is electrically connected to the multi-conductor wireline 2.

FIG. 2 illustrates an end view of the cable head assembly 1 showing the exposed end of the connector 7, and FIG. 3 illustrates a section view through the cable head assembly 1 along line A-A.

An O-ring seal 8 is disposed between the upper body component 6 and the split clamp 5 and a rotating nut 9 is disposed about the upper body component 6. The rotating nut 9 has an external (male) thread for threading engagement with an internal (female) thread of the electrical equipment (not shown) to be connected to the cable head assembly 1. The upper body component 6 extends beyond the rotating nut 9 so as to reveal the connector 7. A pair of O-ring seals 10 are seated in external grooves formed in the upper body component 6. The rotating nut 9 is retained with respect to the upper body component 6 by a retaining ring 11.

In use, the item of electrical downhole equipment, such as a downhole sonde for example, is connected to the cable head assembly 1 and lowered down a bore. The electrical equipment has a barrel portion with an internal screw thread which surrounds a recessed electrical connector. The barrel portion is disposed over the exposed end of the upper body component 6 and is threaded onto the externally threaded rotating nut 9 and tightened. Once the electrical equipment is fully tightened, a fluid tight seal is created by the O-ring seals 10 around the electrical connection between the connectors of the electrical equipment and the connector 7 of the cable head assembly 1.

As can be seen, the retaining ring 11 is used to retain the upper body component 6 of the cable head assembly 1 against the rotating nut 9. The retaining ring 11 is disposed inboard of the O-ring seals 10. The retaining ring 11 is seated in a circumferential groove 12 formed in the radial outer surface of the substantially cylindrical upper body component 6.

Due to the location of the groove 12 inboard of the O-ring seals 10, it is undesirable in this arrangement to use a spiral retaining ring which may damage the integrity of the O-ring seals 10 during installation, or removal for replacement or maintenance purposes. Due to the hostile environment in which the downhole cable head assembly 1 is used, maintaining the integrity of the O-ring seals 10 is of particular importance and frequent removal and replacement of the retaining ring 11 may be required.

FIG. 4 illustrates the retaining ring 11 in plan view. The retaining ring 11 comprises a pair of identical over centre retaining clips 13. One of the clips 13 is shown in detail in FIGS. 5 to 7. The pair of retaining clips 13 cooperate to form the complete annular retaining ring 11. In the embodiment described above, the complete annular retaining ring 11 has a substantially constant annular width, w.

With reference to FIGS. 5 to 7 it can be seen that the retaining clip 13 includes a substantially planar annular sector portion 14 having a sector angle, $\theta$, of approximately 240°. The sector angle is preferably between 210° and 240°. This equates to an over-centre half angle, $\beta$, of between 15° and 30°. This range of angles is preferred for most materials since an angle less than approximately 15° may result in insufficient retaining capability and an angle greater than approximately 30° may result in the clip 13 being too difficult to fit. However, this range of angles is only approximate and is dependent on the material of the clip. Therefore, each clip may have a sector angle of between 200° and 270°.

The retaining clip 13 has a recess 15 at each end of the sector arc. Each recess has an arc angle, $\alpha$, of approximately 24°. The arc angle of each recess will vary depending on the shape of the recess and the sector angle of the clip. The recesses 15 are substantially planar (parallel to the plane of the clip 13) and the thickness of the recess is approximately one half the thickness of the remainder of the clip 13. As can be seen in FIG. 7, the thickness, $t_1$, of the retaining clip 13 intermediate the recessed ends is approximately double the thickness, $t_2$, of the retaining clip at each recessed end. In this way, when a pair of the retaining clips 13 are arranged such that their recessed ends 15 are overlapping, the thickness of the complete annular retaining clip 11 is substantially uniform.

The recessed ends 15 of the pair of retaining clips 13 are sized such that the angle $\alpha$ is slightly greater than double the angle $\beta$, so that a small gap 16 is created between the retaining clips 13 on both the front face and the back face of the complete annular retaining ring 11. Advantageously, the gaps 16 permit a clip removal tool, such as a screwdriver blade or the like, to be inserted in the gap 16 so as to prise the retaining clips 16 from the groove 12.

The retaining clips 13 are made of resiliently deformable material such that each clip 13 can be elastically deformed during installation and removal from the groove 12. Deformation of the clip 13 enables an increase in the radius of curvature of the clip 13 so as to fit over the centre of the circumferential groove 12. Once the expanded retaining clip has passed over the centre of the circumferential groove 12 the resilience of the over centre retaining clip 13 causes it to securely seat and self-retain in the groove 12. The self retaining clips 13 may therefore require no additional securing means to keep the two part retaining ring 11 in situ in the groove 12.

Installing the two part retaining ring 11 in the groove 12 comprises inserting a first retaining clip 13 into the groove 12 in a substantially radial direction from a first side of the groove 12, and inserting a second retaining clip 13 in a substantially radial direction from a second side of the groove 12 opposite the first. The two clips 13 may be installed simultaneously or sequentially. The recesses 15 of the first and second clips 13 must be installed facing in opposite directions such that they overlap when installed.

At the ends of the retaining clip 13, the internal corners 17 and the external corners 18 are radiused. The internal corners 17 may have a larger radius than the external corners 18. The radius on the internal corners 17 helps to ensure that wear against the surface of the groove 12 is minimised during installation and removal of the clip 13, and the radiused outer corners 18 help to ensure that there are no exposed sharp edges in the cable head assembly 1. All edges of the retaining clip 13 may be radiused. The ends of the retaining clip between the inner and outer corners 17, 18 may be straight cut radial edges 19.

The retaining clips 13 may be made of a variety of suitable materials. Examples of suitable metallic materials include stainless steel, spring steel, carbon steel, copper, phosphor bronze or titanium. The retaining clips may similarly be formed of composite or plastic material, for example.

Whilst in the embodiment described above, the retaining clip and retaining ring have been described for use with downhole equipment, it will be appreciated that various alternative embodiments of the clips and alternative uses of the clips are envisaged. For example, the retaining ring could be used across a variety of industries including aerospace, automotive, mining and draining. If the installed retaining ring is expected to experience significant vibration and shock, then the retaining clips may include ears, or other fixing means, for fixing the clips together.

Although the invention has been described above with reference to one or more preferred embodiments, it will be appreciated that various changes or modifications may be made without departing from the scope of the invention as defined in the appended claims.

The invention claimed is:

1. A retaining ring comprising a pair of retaining clips, wherein each of the pair of retaining clips comprises a planar annular sector portion with a sector angle of over 180° and having a recess at each end of the sector arc such that the ends of the sector arc are recessed,
    wherein the recessed ends cooperate such that the pair of retaining clips form a complete annulus such that the retaining ring is completely annular,
    wherein the completely annular retaining ring has a constant annular width, and
    wherein each of the pair of retaining clips is a resilient over-center retaining clip configured to self-retain on a cylindrical body.

2. A retaining ring according to claim 1, wherein the recessed ends of each clip are substantially planar.

3. A retaining ring according to claim 1, wherein the sector angle of each clip is less than 270°, preferably between 200° and 270°, and most preferably between 210° and 240°.

4. A retaining ring according to claim 1, wherein each clip comprises a resiliently deformable material.

5. A retaining ring according to claim 1, wherein each clip is metallic, preferably stainless steel, spring steel, carbon steel, copper, phosphor bronze or titanium.

6. A retaining ring according to claim 1, wherein each clip has a straight radial edge at each end of the sector arc.

7. A retaining ring according to claim 1, wherein each clip has, at each end of the sector arc, rounded interior corners and/or exterior corners.

8. A retaining ring according to claim 1, wherein the retaining clips are identical.

9. A retaining ring according to claim 1, wherein the retaining clips are complimentary but not identical.

10. A retaining ring according to claim 1, wherein the cooperating recesses match imperfectly to define a gap between the retaining clips.

11. A retaining ring according to claim 1, wherein the thickness of the annulus is substantially uniform.

12. A retaining ring according to claim 1, wherein the retaining clips include ears for fixing the clips together.

13. A downhole tool comprising a retaining ring according to claim 1.

14. A downhole tool according to claim 13, wherein the downhole tool includes a cable head assembly and the retaining ring retains a cable head or a lower barrel component with respect to a main barrel component of the assembly.

15. A method of installing a retaining ring in a groove formed in a component, the method comprising;
    inserting a first retaining clip into the groove in a substantially radial direction from a first side of the groove, and
    inserting a second retaining clip into the groove in a substantially radial direction from a second side of the groove opposite the first side of the groove,
    wherein each of the first and second retaining clips comprises a substantially planar annular sector portion with a sector angle of over 180° and having a recess at each end of a sector arc,
    wherein, when installed, the first and second retaining clips form a complete annulus with respective recesses of the first and second retaining clips cooperating, such that the retaining ring is completely annular,
    wherein the completely annular retaining ring has a substantially constant annular width, and
    wherein each of the first and second retaining clips is a resilient over-center retaining clip configured to self retain on a substantially cylindrical body.

* * * * *